United States Patent [19]

Mark

[11] Patent Number: 4,526,956
[45] Date of Patent: Jul. 2, 1985

[54] COPOLYESTER-CARBONATES EXHIBITING IMPROVED PROCESSABILITY

[75] Inventor: Victor Mark, Evansville, Ind.

[73] Assignee: General Electric Company, Mt. Vernon, Ind.

[21] Appl. No.: 448,386

[22] Filed: Dec. 9, 1982

[51] Int. Cl.$^3$ .............................................. C08G 63/64
[52] U.S. Cl. .................................... 528/176; 528/125; 528/126; 528/128; 528/173; 528/190; 528/191; 528/193; 528/194; 528/195; 524/157; 524/511
[58] Field of Search ............... 528/176, 125, 126, 128, 528/173, 190, 191, 193, 194, 195; 524/157, 511

[56] References Cited

U.S. PATENT DOCUMENTS

| | | | |
|---|---|---|---|
| 3,030,331 | 4/1962 | Goldberg | 260/42 |
| 3,161,615 | 12/1964 | Goldberg | 528/195 |
| 3,169,121 | 2/1965 | Goldberg | 528/176 |
| 3,207,814 | 9/1965 | Goldberg | 528/195 |
| 3,879,348 | 4/1975 | Serink et al. | 528/195 |
| 4,194,038 | 3/1980 | Baker et al. | 528/182 |
| 4,260,719 | 4/1981 | Ching | 528/191 |
| 4,260,732 | 4/1981 | Ching | 528/191 |
| 4,312,975 | 1/1982 | Salee | 528/176 |
| 4,381,358 | 4/1983 | Rosenquist | 528/176 |

*Primary Examiner*—Lester L. Lee
*Attorney, Agent, or Firm*—Myron B. Kapustij; Martin B. Barancik

[57] ABSTRACT

Novel copolyester-carbonates exhibiting improved processability comprised of the polymerized reaction products of (i) at least one dihydric phenol, (ii) at least one difunctional carboxylic acid or a reactive derivative thereof, (iii) a carbonyl halide carbonate precursor, and (iv) a processability improving amount of at least one particular bishaloformate.

21 Claims, No Drawings

COPOLYESTER-CARBONATES EXHIBITING IMPROVED PROCESSABILITY

BACKGROUD OF THE INVENTION

Copolyester-carbonates are known thermoplastic materials which, due to their many advantageous properties, find use as thermoplastic engineering materials in many commercial and industrial applications. The copolyester-carbonates exhibit, for example, excellent properties of toughness, flexibility, impact resistance and high heat distortion temperatures. The copolyester-carbonates and their preparation are disclosed, for example, in U.S. Pat. Nos. 3,169,121; 3,030,331; 4,156,069; and 4,194,038. These copolyester-carbonates, due to their relatively high melt viscosities, are generally relatively difficult to process. It would thus be very advantageous if copolyester-carbonates could be provided which while retaining substantially all or most of their advantageous properties were easier to process.

It is, therefore, an object of this invention to provide copolyester-carbonates which are easier to process and which simultaneously retain substantially all or most of their other advantageous properties.

SUMMARY OF THE INVENTION

In accordance with the instant invention there are provided novel copolyester-carbonate polymers which exhibit improved processability while at the same time exhibiting, to a substantial degree, substantially most of the other advantageous properties of copolyester-carbonate resins.

These novel copolyester-carbonates are comprised of the polymerized reaction products of (i) a carbonyl halide carbonate precursor, (ii) at least one dihydric phenol, (iii) at least one difunctional carboxylic acid or a reactive derivative thereof, and (iv) at least one particular bishaloformate.

DESCRIPTION OF THE INVENTION

It has been discovered that copolyester-carbonate polymers can be obtained which exhibit improved processability while at the same time retaining, to a substantial degree, substantially most of the other advantageous properties of copolyester-carbonates.

Briefly stated, the copolyester-carbonates of this invention comprise recurring carbonate groups, carboxylate groups, and aromatic carbocyclic groups in the linear polymer, in which at least some of the carboxylate groups and at least some of the carbonate groups are bonded directly to the ring carbon atoms of the aromatic carbocyclic groups. These copolyester-carbonates are disclosed in U.S. Pat. No. 3,169,121, which is hereby incorporated herein by reference.

These copolyester-carbonate polymers contain ester linkages and carbonate linkages in the polymer chain, wherein the amount of the ester linkages is in the range of from about 25 to about 90 mole percent, and preferably in the range of from about 35 to about 80 mole percent.

The copolyester-carbonates of the instant invention are prepared by reacting (i) a carbonate precursor, (ii) at least one dihydric phenol, (iii) at least one difunctional carboxylic acid or a reactive derivative thereof, and (iv) at least one particular bishaloformate.

The particular bishaloformate utilized in the practice of the instant invention is selected from bishaloformates represented by the general formulae:

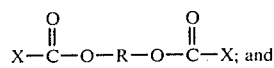

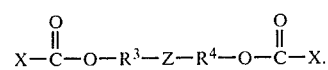

In Formula I X is independently selected from chlorine and bromine radicals. R in Formula I represents a divalent aliphatic hydrocarbon radical containing from 1 to about 30 carbon atoms. This divalent aliphatic hydrocarbon radical is selected from:
(i) alkylene radicals containing from 1 to about 30 carbon atoms;
(ii) cycloalkylene radicals containing from 4 to about 30 carbon atoms represented by the general formula

wherein $R^5$ is independently selected from alkyl radicals, preferably alkyl radicals containing from 1 to about 5 carbon atoms, A represents a cycloalkylene radical containing from 4 to about 16 ring carbon atoms, and p is a whole number having a value of from 0 up to and including the number of replaceable hydrogen atoms present on A, p preferably represents a whole number having a value of from 0 to 4 inclusive.; and
(iii) divalent radicals represented by the general formula

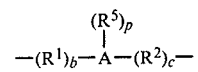

wherein $R^1$ and $R^2$ are independently selected from alkylene radicals containing from 1 to about 20 carbon atoms, the letters b and c independently represent zero or one, with the proviso that the sum of b and c is at least one, and $R^5$, A, and p are as defined hereinafore.

In Formula II X is independently selected from chlorine and bromine radicals. $R^3$ and $R^4$ in Formula II are independently selected from divalent aliphatic hydrocarbon radicals containing from 1 to about 30 carbon atoms. These divalent aliphatic hydrocarbon radicals are selected from:
(i) alkylene radicals containing from 1 to about 30 carbon atoms;
(ii) cycloalkylene radicals containing from 4 to about 30 carbon atoms represented by Formula Ia; and
(iii) divalent radicals represented by Formula Ib.

Z in Formula II is selected from:
(i) the —O— radical;
(ii) the —S— radical;
(iii) the

radical;

(iv) the

radical;

(v) the

radical;

(vi) the

radical;

(vii) the

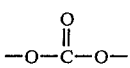

radical;

(viii) the —(R$^6$)$_d$—Ar—(R$^7$)$_e$— radical wherein Ar represents a divalent mono-, di-, or polynuclear aromatic radical, preferably one containing from 6 to 18 carbon atoms, R$^6$ and R$^7$ are independently selected from alkylene radicals containing from 1 to about 10 carbon atoms, and the letters d and e are independently selected from zero or one; and (ix) a divalent organic aliphatic hetero non-cyclic radical containing at least one carbon atom and at least one hetero group or atom selected from —O—, —S—,

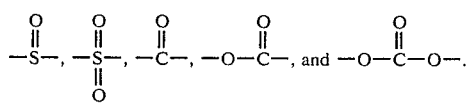

The alkylene radicals represented by R, R$^3$ and R$^4$ can be either branched alkylene radicals or straight chain alkylene radical. Preferably, alkylene radicals containing more than about 20 carbon atoms are branched alkylene radicals. It is preferred that when branching occurs that the branched groups be lower alkyl radicals, i.e., alkyl radicals containing from 1 to about 5 carbon atoms.

The alkylene radicals represented by R$^1$ and R$^2$ may likewise be straight chain alkylene radicals or branched alkylene radicals.

Some illustrative non-limiting examples of straight chain alkylene radicals include ethylene, 1,3-propylene, 1,4-butylene, 1,5-pentylene, 1,8-octylene, 1,10-decylene, 1,12-dodecylene, 1,16-hexadecylene, 1,20-eicosylene, and the like.

Some illustrative non-limiting examples of branched alkylene radicals include

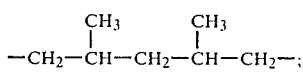

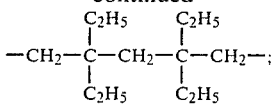

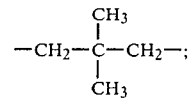

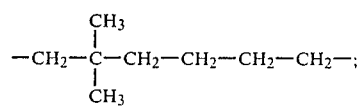

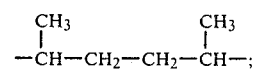

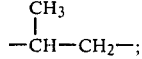

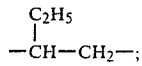

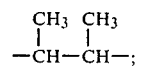

and the like.

Some illustrative non-limiting examples of the cycloalkylene radicals of Formula Ia include 1,3-cyclobutylene, 1,3-cyclopentylene, 1,4-cyclohexylene, 2-methyl-1,4-cyclohexylene, 1,4-dimethyl-1,4-cyclohexylene, cyclooctylene, and the like.

Some illustrative non-limiting examples of the divalent radicals of Formula Ib include:

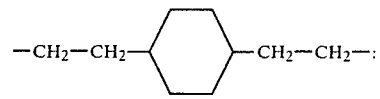

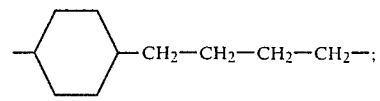

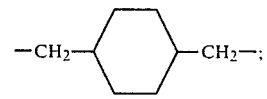

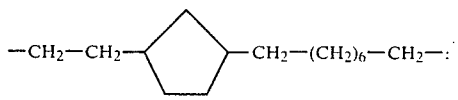

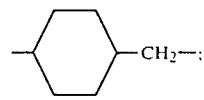

-continued

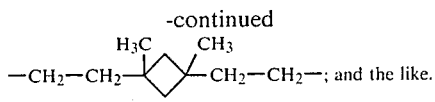; and the like.

Some illustrative non-limiting examples of —R$^3$—Z—R$^4$— in Formula II, when Z represents —O—, include:

—CH$_2$—CH$_2$—CH$_2$—O—CH$_2$—CH$_2$—CH$_2$—;
—CH$_2$—CH$_2$—O—CH$_2$—CH$_2$—

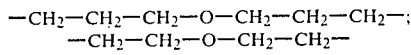

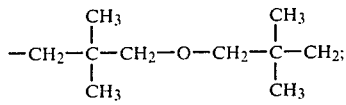

and the like.

Some illustrative non-limiting examples of —R$^3$—Z—R$^4$— in Formula II, when Z represents —S—, include:

—CH$_2$—CH$_2$—S—CH$_2$—CH$_2$—;

and the like.

Some illustrative non-limiting examples of —R$^3$—Z—R$^4$— in Formula II, when Z represents

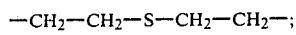

include:

—CH$_2$—CH$_2$—S(=O)—CH$_2$—CH$_2$—.

Some illustrative non-limiting examples of —R$^3$—Z—R$^4$— in Formula II when Z represents

include:

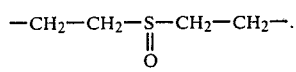

—CH$_2$—CH$_2$—C(=O)—CH$_2$—(CH$_2$)$_5$—CH$_2$—;

and the like.

Some illustrative non-limiting examples of —R$^3$—Z—R$^4$— in Formula II when Z represents

include:

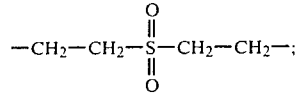

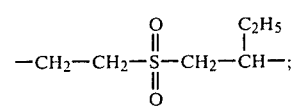

and the like.

When Z in Formula II represents —(R$^6$)$_d$—Ar—(R$^7$)$_e$— radicals it is preferred that the aromatic radicals represented by Ar be selected from phenylene, alkyl substituted phenylene, naphthylene, alkyl substituted naphthalyene, biphenylene, and alkyl substitued biphenylene. When Ar represents an alkyl substituted phenylene, alkyl substituted naphthylene, or alkyl substituted biphenylene it is preferred that the substituent alkyl groups be lower alkyl groups, i.e., those alkyl groups containing from 1 to about 5 carbon atoms. It is further preferred that the number of alkyl substituent groups be no more than 2. R$^6$ and R$^7$ can be either straight chain alkylene groups or branched chain alkylene groups. If R$^6$ and R$^7$ are branched chain alkylene groups it is preferred that branching, if present, occur at the beta carbon atom. It is further preferred that the branching groups be lower alkyl groups. Some illustrative non-limiting examples of radicals represented by —(R$^6$)$_d$—Ar—(R$^7$)$_e$— include:

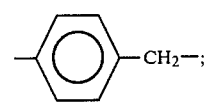

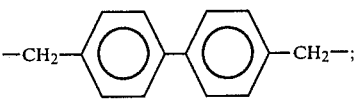

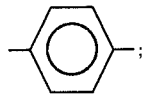

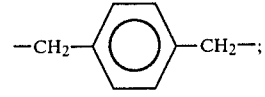

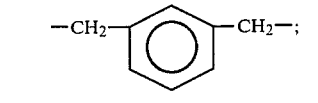

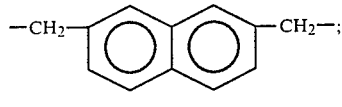

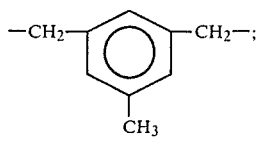

Z in Formula II may also represent a divalent organic aliphatic hetero non-cyclic radical containing at least one carbon atom and at least one hetero group or atom selected from

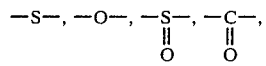

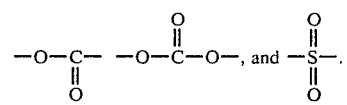

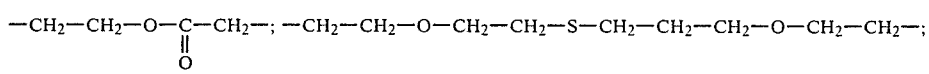

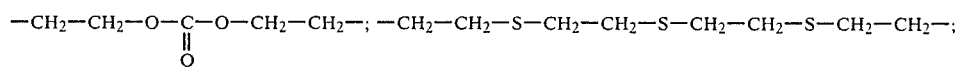

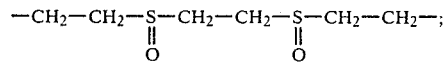

That is to say, Z may be a divalent organic radical which is linear and aliphatic in character and which contains in the linear backbone at least one carbon atom, i.e., a hydrocarbon group, and at least one hetero group or atom, i.e., an inorganic group or atom, of the type described hereinafore. While this divalent radical is generally linear, i.e., it is non-cyclic, it is to be understood that minor amounts of branching may be present. The amount of branching that may be present is an amount that does not affect the linear character of the hetero backbone. The branching groups, if present, are preferably lower alkyl groups, i.e., alkyl groups containing from 1 to about 5 carbon atoms.

Illustrative of these divalent organic aliphatic non-cyclic hetero radicals are the divalent polyether residues. These divalent polyether residues may be represented by the general formula $$(-R^8-O-)_y \qquad \text{III.}$$

wherein $R^8$ is an alkylene radical, preferably a lower alkylene radical containing from 1 to about 5 carbon atoms, and y is a number having a value from 2 to about 350.

Some illustrative non-limiting examples of the polyether residues represented by Formula III include:

$(-CH_2-CH_2-O-)_{4.5}$;
$(-CH_2-CH_2-O-)_9$;
$(-CH_2-CH_2-O-)_{23}$;
$(-CH_2-O-)_{62}$;
$(-CH_2-CH_2-O-)_{77}$;
$(-CH_2-CH_2-O-)_{155}$;
$(-CH_2-CH_2-O-)_{320}$; and the like.

Some other non-limiting illustrative eaxmples of these divalent organic aliphatic non-cyclic hetero radicals include:

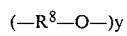

and the like.

The bishaloformates of Formulae I and II are known compounds which are either commercially available or may be readily prepared by known methods.

Thus, for example, one method of preparing the bishaloformates of Formulae I and/or II involves reacting two moles of a carbonyl halide of the formula

with one mole of a diol of the formula HO—R—OH or HO—$R^3$—Z—$R^4$—OH, wherein X, Z, R, $R^3$ and $R^4$ are as defined hereinafore.

Some illustrative non-limiting examples of the bishaloformates of Formulae I and II are set forth in Table I.

TABLE I

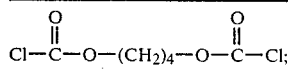  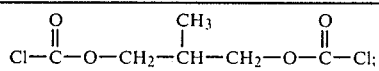

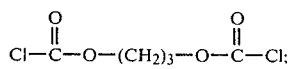  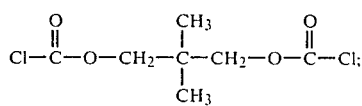

  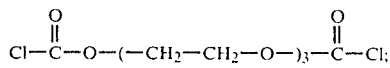

  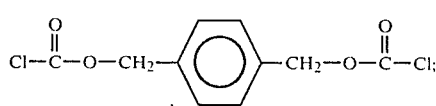

TABLE I-continued

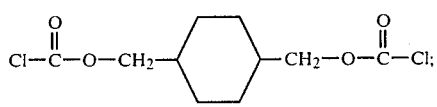
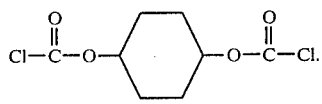

The dihydric phenols useful in formulating the copolyester-carbonates of the instant invention will in general conform to the general formula

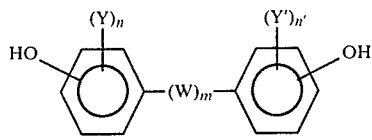

wherein:
Y is independently selected from halogen, monovalent hydrocarbon, and monovalent hydrocarbonoxy radicals;
Y' is independently selected from halogen, monovalent hydrocarbon, and monovalent hydrocarbonoxy radicals;
W is selected from divalent hydrocarbon radicals,

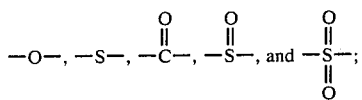

n and n' are independently selected from whole numbers having a value of from 0 to 4 inclusive; and
m is either zero or one.

Preferred halogen radicals represented by Y and Y' are chlorine and bromine.

The preferred monovalent hydrocarbon radicals represented by Y and Y' are selected from alkyl radicals, perfereably those containing from 1 to about 6 carbon atoms, aryl radicals, preferably those containing from 6 to 12 carbon atoms such as phenyl, naphthyl, biphenyl, and aralkyl and aralkyl radicals, preferably those containing from from 7 to about 14 carbon atoms.

The hydrocarbonoxy radicals represented by Y and Y' may be represented by the general formula $-OR^9$ wherein $R^9$ represents a monovalent hydrocarbon radical, preferably an alkyl radical or an aryl radical. The preferred hydrocarbonoxy radicals are the alkoxy radicals and the aryloxy radicals. The preferred alkoxy radicals are those containing from 1 to about 6 carbon atoms. The preferred aryloxy radicals are those containing from 6 to 12 carbon atoms.

The divalent hydrocarbon radical represented by W is preferably selected from alkylene radicals, alkylidene radicals, cycloalkylene radicals, and cycloalkylidene radicals.

Preferred alkylene radicals are those conating from 1 to about 8 carbon atoms. Preferred alkylidene radicals are those containing from 1 to about 8 carbon atoms. Preferred cycloalkylene and cycloalkylidene radicals are those containing a total of from about 5 to about 18 carbon atoms. These cycloalkylene and cycloalkylidene radicals preferably contain from 5 to about 7 ring carbon atoms and may have from 1 to about 3 of the hydrogen atoms of the ring carbon atoms replaced by alkyl, preferably lower alkyl, substituent groups.

In the dihydric phenol compounds represented by Formula IV, when more than one Y substituent is present they may be the same or different. The same is true for the Y' substituent. Where m is zero in Formula IV the aromatic rings are directly joined together with no intervening alkylene or other bridge. The positions of the hydroxyl groups and Y or Y' on the aromatic nuclear residues can be varied in the ortho, meta, or para positions and the groupings can be in a vicinal, asymmetrical or symmetrical relationship, where two or more ring carbon atoms of the aromatic hydrocarbon residues are substituted with Y or Y' and hydroxyl.

Some illustrative non-limiting examples of dihydric phenol compounds falling within the scope of Formula IV include:
2,2-bis(4-hydroxyphenyl)propane (bisphenol-A);
2,2-bis(4-hydroxy-3,5-dimethylphenyl)propane;
3,3-bis(4-hydroxyphenyl)pentane;
4,4-bis(4-hydroxyphenyl)heptane;
2,2-(3,5,3',5'-tetrachloro-4,4'-dihydroxydiphenyl)propane;
2,2-(3,3',5',-tetrabromo-4,4'-dihydroxydiphenyl)propane;
bis(4-hydroxyphenyl)sulfone;
bis(4-hydroxyphenyl)sulfide;
bis(3,5-dimethyl-4-hydroxyphenyl)methane;
2,2-bis(3,5-dimethyl-4-hydroxyphenyl)propane;
1,1-bis(4-hydroxyphenyl)cyclohexane;
1,4-bis(3,5-diethyl-4-hydroxyphenyl)cyclohexane;
bis(4-hydroxyphenyl)methane;
4,4'-dihydroxy-2,6-dimethyldiphenyl ether; and the like.

A variety of additional dihydric phenols are also available and may be used in the practice of the instant invention. Some of these additional dihydric phenols are disclosed in U.S. Pat. Nos. 2,999,835; 3,018,365, and 3,153,008, all of which are hereby incorporated herein by reference. It is, of course, possible to employ mixtures of two or more dihydric phenols, and where the term dihydric phenol is used herein it is understood that it encompasses mixtures of two or more different dihydric phenols as well as individual dihydric phenols.

The carbonyl halides utilized as the carbonate precursors in the formulation of the instant copolyester-carbonates are carbonyl chloride, carbonyl bromide, or mixtures thereof. Carbonyl chloride, also known as phosgene, is the preferred carbonate precursor.

In general, any difunctional carboxylic acid conventionally used in the preparation of linear polyesters may be utilized for the preparation of the copolyester-carbonates of the instant invention. In general, the difunctional carboxylic acids which may be used include the aliphatic carboxylic acids, aliphatic-aromatic carboxylic acids, and aromatic carboxylic acids. These acids are disclosed in U.S. Pat. No. 3,169,121.

The carboxylic acids which may be utilized in the instant invention generally conform to the formula $$R'-(R'')_q-COOH \qquad V.$$

wherein R" is an alkylene, alkylidene, or cycloaliphatic group; an alkylene, alkylidene or cycloaliphatic group containing ethylenic unsaturation; an aromatic group such as phenylene, naphthylene, biphenylene, substituted phenylene, and the like; two or more aromatic groups connected through non-aromatic linkages such as alkylene or alkylidene groups; or a divalent aralkyl radical such as tolylene, xylylene, and the like. R' is either a carboxyl group or a hydroxyl group. The letter q represents one where R' is a hydroxyl group and either zero or one where R' is a carboxyl group.

Preferred difunctional carboxylic acids are the aromatic difunctional carboxylic acids, i.e., those acids of Formula V wherein R" represents a divalent aromatic radical and q is one. The preferred aromatic difunctional carboxylic acids are those represented by the general formula

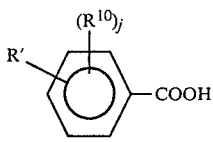

VI.

wherein R' is as defined hereinafore; j is a whole number having a value of from 0 to 4 inclusive; and $R^{10}$ may be an inorganic atom such as chlorine or bromine, and the like, a monovalent hydrocarbon radical such as an alkyl, aryl, alkaryl or alkaryl, or an inorganic group such as a nitro group, an amine group, and the like. When more than one $R^{10}$ is present they may be the same or different.

Prefereably $R^{10}$ is selected from chlorine, bromine, alkyl radicals, aryl radicals, alkaryl radicals, and aralkyl radicals.

Mixtures of these difunctional carboxylic acids may be employed and where the term difunctional carboxylic acid is mentioned herein it is meant to include mixtures of two or more difunctional carboxylic acids as well as single difunctional carboxylic acids.

Preferred difunctional carboxylic acids are isophthalic acid, terephthalic acid, and mixtures thereof. A particularly preferred difunctional carboxylic acid comprises a mixture of isophthalic acid and terephthalic acid in a weight ratio of from about 1:10 to about 10:1.

Rather than utilizing the difunctional carboxylic acid per se it is possible, and sometimes even preferred, to employ the reactive derivatives of this acid. Illustrative of these reactive derivatives are the acid halides. The preferred acid halides are the acid chlorides and the acid bromides. Thus, for example, rather than using terephthalic acid, isophthalic acid, or mixtures thereof, terephthaloyl dichloride, isophthaloyl dichloride, or mixtures thereof may be used.

Also included within the scope of the instant invention are the high molecular weight thermoplastic randomly branched copolyester-carbonates. These randomly branched copolyester-carbonates are prepared by coreacting a minor amount of a polyfunctional organic compound with the aforedescribed dihydric phenol, a carbonate precursor, the bishaloformate, and the difunctional carboxylic acid or a reactive derivative thereof. The polyfunctional organic compounds useful in producing the branched copolyester-carbonate resins are disclosed, for example, in U.S. Pat. Nos. 3,635,895 and 4,001,184, both of which are incorporated herein by reference. These polyfunctional compounds are generally aromatic and contain at least three functional groups which may be carboxyl, carboxylic anhydride, hydroxyl, halformyl, and mixtures thereof. Some illustrative examples of these compounds include trimellitic anhydride, trimellitic acid, trimellityl chloride, pyromellitic acid, mellitic acid, and the like.

The copolyester-carbonates of the instant invention may be prepared by any of the well known methods for preparing copolyester-carbonates. One of these methods involves the heterogeneous interfacial polymerization system utilizing an aqueous caustic solution, an organic water immiscible solvent, at least one dihydric phenol of Formula IV, at least one difunctional carboxylic acid or a reactive derivative thereof, at least one bischloroformate of Formulae I and II, the carbonyl halide carbonate precursor, a catalyst, and a molecular weight regulator.

Another useful method for preparing the copolyester-carbonate polymers of the instant invention involves the use of an organic solvent system wherein the organic solvent system may also function as an acid acceptor, at least one dihydric phenol of the type described hereinafore, at least one bishaloformate of Formulae I and II, at least one difunctional carboxylic acid or a reactive derivative thereof, a carbonyl halide carbonate precursor, and a molecular weight regulator and a catalyst.

Generally, in both of the aforedescribed methods phosgene is passed into a reaction mixture containing at least one dihydric phenol and at least one bishaloformate of Formulae I or II. The reaction mixture may also contain the difunctional carboxylic acid or a reactive derivative thereof. Alternately, the acid or its reactive derivative may be introduced concurrently with the introduction of the phosgene or at some point after the introduction of the phosgene has commenced.

The amount of the bishaloformate of the instant invention employed is a processability improving amount. By processability improving amount is meant an amount of bishaloformate effective to improve the processability of the copolyester-carbonate resin, i.e., lower the melt viscosity of the resin, but insufficient to significantly adversely affect the advantageous properties of the resin. Generally, this amount is in the range of from about 0.5 to about 15 mole %, based on the amount of dihydric phenol employed, and preferably in the range of from about 1 to about 10 mole %. In general, if an amount of bishaloformate utilized is less than about 0.5 mole % there is no significant improvement in the processability of the resin. If more than about 15 mole percent of the bishaloformate is utilized the other advantageous physical properties of the resin begin to be significantly adversely affected.

Rather than employing just one bishaloformate of Formula I or one bishaloformate of Formula II it is possible to utilize mixtures of two or more of these bishaloformates. Thus, for example, it is possible to utilize mixtures of at least one bishaloformate of Formula I and at least one bishaloformate of Formula II, a mixture of two or more bishaloformates of Formula I, or a mixture of two or more bishaloformates of Formula II. Therefore, when the term bishaloformate is employed herein it is meant to include mixtures of two or more of the instant bishaloformates as well as individual bishaloformates.

The copolyester-carbonate polymers of the instant invention may optionally have admixed therewith certain commonly known and used additives such as antioxidants; antistatic agents; mold release agents; impact modifiers; fillers such as glass fibers, talc, clay, mica, and the like; ultraviolet radiation absorbers such as the benzophenones, benzotriazoles, benzylidene malonates, and the like; hydrolytic stabilizers such as the epoxides disclosed in U.S. Pat. Nos. 3,489,716; 4,138,379 and 3,839,247; color stabilizers such as the organophosphites; and flame retardants.

Some particularly useful flame retardants include the alkali and alkaline earth metal salts of sulfonic acids. These types of flame retardants are disclosed in U.S. Pat. Nos. 3,933,734; 3,948,851; 3,926,908; 3,919,167; 3,909,490; 3,953,396; 3,931,100; 3,978,024; 3,953,399; 3,917,559; 3,951,910 and 3,940,366, all of which are hereby incorporated herein by reference.

Another embodiment of the instant invention is comprised of a blend of (i) at least one copolyester-carbonate resin of the type described hereinafore, i.e., one derived from the reaction of (a) at least one dihydric phenol of Formula IV, (b) a carbonyl halide carbonate precursor, (c) at least one difunctional carboxylic acid or a reactive derivative thereof, and (d) at least one bishaloformate selected from the bishaloformates represented by Formulae I and II (hereinafter referred to as copolyester-carbonate resin A); and (ii) at least one conventional copolyester-carbonate resin, i.e. one derived from (a) at least one dihydric phenol, (b) at least one difunctional carboxylic acid or a reactive derivative thereof, and (c) a carbonate precursor (hereinafter referred to as copolyester-carbonate resin B).

In this embodiment, however, copolyester-carbonate resin A may be derived from (i) at least one dihydric phenol of Formula IV, (ii) at least one difunctional carboxylic acid or a reactive derivative thereof, (iii) a carbonyl halide carbonate precursor, and (iv) from about 0.1 to about 50 mole %, based on the amount of the dihydric phenol present, of at least one bishaloformate selected from bishaloformates represented by Formulae I and II.

These blends exhibit improved processability while retaining, to a substantial degree, most of their other advantageous properties.

Generally, these blends contain an amount of resin A effective to improve the processability of the blends but insufficient to deleteriously significantly affect the other advantageous properties of the blends. That is to say, these blends conatin a processability improving amount of resin A. This amount is generally in the range of from about 0.5 to about 30 weight percent, based on the total amount of resin A and B present in the blends, preferably from about 1 to about 15 weight percent.

These blends are generally prepared by first preforming copolyester-carbonate resins A and B, and thereafter physically thoroughly mixing them together.

These blends may further optionally contain admixed therein the various additives described hereinafore.

Yet another embodiment of the instant invention is a blend comprised of (i) at least one copolyester-carbonate resin B; and (ii) at least one copolyester-carbonate resin derived from (a) at least one dihydric phenol of Formula IV, (b) at least one difunctional carboxylic acid or a reactive derivative thereof, and (iii) at least one bishaloformate selected from bishaloformates represented by Formulae I and II (hereinafter referred to as resin C).

These blends exhibit improved processability while at the same time retaining, to a substantial degree, substantially most of their other advantageous properties.

Generally, these blends contain a processability improving amount of resin C. By processability improving amount is meant an amount effective to improve the processability of the blends but insufficient to significantly deleteriously affect any or most of their other advantageous properties. This amount is generally in the range of from about 0.1 to about 15 weight percent, based on the total amount of resins B and C present in the blends.

These blends may generally be prepared by first preforming the copolyester-carbonate resins B and C, and thereafter thoroughly mixing them together.

The blends of this embodiment may also optionally contain the various additives described hereinafore.

DESCRIPTION OF THE PREFERRED EMBODIMENT

In order to more fully and clearly illustrate the present invention the following examples are presented. It is intended that the examples be considered as illustrative rather than limiting the invention as disclosed and claimed herein. In the examples all parts and percentages are on a weight basis unless otherwise specified.

The following examples illustrate the preparation of the bishaloformates of the instant invention.

EXAMPLE 1

Into a three-neck one liter reaction flask provided with a stirrer, a dry-ice reflux condenser and a gas inlet tube there were condensed from about three to five moles of phosgene (from 300 to 500 grams) with the aid of a cooling bath into which the flask was immersed. After the desired amount of phosgene was liquified in the reaction flask, the gas inlet tube was replaced by an addition funnel, from which one mole (90.12 grams) of 1,4-butanediol was added dropwise. The moderately exothermic reaction, in which the hydrogen chloride liberated was allowed to escape but the excess of phosgene was returned by the dry ice condenser, was regulated by both the rate of addition of the reactant and by cooling in the cooling bath. After the addition of the 1,4-butanediol was completed, in a period of from about one to two hours, excess phosgene was recovered by distillation, followed by distillation of the bischloroformate under vacuum. Some of the characteristic physical properties of the bischloroformate product, which was obtained in essentially quantitative yield, are set forth in Table II.

EXAMPLE 2

The procedure of Example 1 was substantially repeated except that one mole (90.12) grams of 2-methyl-1,3-propanediol was substituted for the 1,4-butanediol.

EXAMPLE 3

The procedure of Example 1 was substantially repeated except that one mole (76.10 grams) of 1,3-propanediol was substituted for the 1,4-butanediol.

EXAMPLE 4

The procedure of Example 1 was substantially repeated except that one mole (104.15 grams) of 2,2-dimethyl-1,3-propanediol was substituted for the 1,4-butanediol.

EXAMPLE 5

The procedure of Example 1 was substantially repeated except that one mole (62.07 grams) of 1,2-ethanediol was substituted for the 1,4-butanediol.

EXAMPLE 6

The procedure of Example 1 was substantially repeated except that one mole (166.18 grams) of triethylene glycol was substituted for the 1,4-butanediol.

EXAMPLE 7

The procedure of Example 1 was substantially repeated except that one mole (178.19 grams) of bis (1,3-propanediol)carbonate was substituted for the 1,4-butanediol.

EXAMPLE 8

The procedure of Example 1 was substantially repeated except that one mole (263.2 grams) of tetraethylene glycol was substituted for the 1,4-butanediol.

The data in Table II illustrates the bischloroformates obtained in Examples 1-8, as well as some of the physical properties of these bischloroformates, i.e., the boiling point and the refractive index.

TABLE II

| Example No. | Bischloroformate | Boiling Point °C./mm pressure | Refractive Index $n$D/(T) |
|---|---|---|---|
| 1 | Cl—C(=O)—O—(CH$_2$)$_4$—O—C(=O)—Cl | 81–82/0.2 | 1.4520/23 |
| 2 | Cl—C(=O)—O—CH$_2$—CH(CH$_3$)—CH$_2$—O—C(=O)—Cl | 71–72/0.25 | 1.4490/20 |
| 3 | Cl—C(=O)—O—(CH$_2$)$_3$—O—C(=O)—Cl | 68–69/0.2 | 1.4520/20 |
| 4 | Cl—C(=O)—O—CH$_2$—C(CH$_3$)$_2$—CH$_2$—O—C(=O)—Cl | 65–66/0.15 | 1.4462/20 |
| 5 | Cl—C(=O)—O—(CH$_2$)$_2$—O—C(=O)—Cl | 44–46/0.01 | 1.4490/22 |
| 6 | Cl—C(=O)—O—(CH$_2$—CH$_2$—O—)$_3$—C(=O)—Cl | 150–151/0.65 | 1.4556/22 |
| 7 | Cl—C(=O)—O—(CH$_2$)$_3$—O—C(=O)—O—(CH$_2$)$_3$—O—C(=O)—Cl | 162–165/0.9 | 1.4596/19 |
| 8 | Cl—C(=O)—O—(CH$_2$—CH$_2$—O—)$_4$—C(=O)—Cl | — | 1.4600/19 |

The following example illustrates the preparation of a conventional copolyester-carbonate resin falling outside the scope of the instant invention. This example is presented for comparative purposes.

EXAMPLE 9

To a 2 liter reaction vessel there were added 34.2 grams (0.15 mole) of 4,4′-isopropylidenebisphenol (bisphenol-A), 0.35 gram (2.5 mole %) of phenol, 0.42 milliliter (2 mole %) of triethylamine, 400 milliliters of methylene chloride and 300 milliliters of water. A 25% aqueous solution of sodium hydroxide was added to adjust the pH of the reaction mixture and thereafter maintain it at about 11. Isophthaloyl dichloride, 7.6 grams (0.0375 mole), dissolved in 10 grams of methylene chloride was added dropwise to the reaction mixture over a period of five minutes while maintaining the pH at 11 with the use of an automatic titrator. After the pH became stable, without the use of more sodium hydroxide, phosgene was introduced at a rate of 0.5 gram per minute for 26 minutes while maintaining the pH at 11. The amount of phosgene added was 13 grams (0.133 mole). The methylene chloride layer was separated from the alkaline aqueous solution, washed with 0.01N aqueous hydrochloric acid solution, followed by two washings with deionized water. The copolyester-carbonate resin was precipitated with methanol and dried in a vacuum oven at 60° C.

The intrinsic viscosity of the resultant polymer is 0.530 dl/gm and the melt flow rate is 2.3 grams per 10 minutes at 300° C.

The following example illustrates the preparation of a copolyester-carbonate resin of the instant invention.

EXAMPLE 10

To a 2 liter reaction vessel there were added 34.2 grams (0.15 mole) of 4,4′-isopropylidenebisphenol (bisphenol-A), 0.35 gram (2.5 mole %) of phenol, 0.42 milliliter (2 mole %) of triethylamine, 400 milliliters of methylene chloride and 300 milliliters of water. A 25% aqueous solution of sodium hydroxide was added to adjust the pH of the reaction mixture and thereafter maintain it at about 11. Isophthaloyl dichloride, 7.6 grams (0.0375 mole), dissolved in 10 grams of methylene chloride was added dropwise to the reaction mixture over a period of five minutes while maintaining the pH at 11 by the addition of the aqueous caustic solution via an automatic titrator. 1.9 grams ( 6 mole %) of 1,4-butanediol bischloroformate (the bischloroformate prepared substantially in accordance with the procedure of Example 1) were added to the reaction mixture while maintaining the pH at 11. Phosgene was then introduced at a rate of 0.5 grams per minute for 26 minutes, corresponding to 13 grams of phosgene (0.133 mole), while maintaining the pH at 11 by the use of the aqueous caustic solution. The methylene chloride layer was separated from the alkaline aqueous solution, washed with 0.01N aqueous hydrochloric acid solution, followed by two washings with deionized water. The copolyester-carbonate resin was precipitated with methanol and dried in a vacuum oven at 60° C.

The resultant copolyester-carbonate polymer had an intrinsic viscosity of 0.525 dl/gm and a melt flow rate of 10.76 grams per 10 minutes at 300° C.

The intrinsic viscosity of the copolyester-carbonate polymers of Examples 9 and 10 was measured in methylene chloride at 25° C. The melt flow rate of these polymers was determined in accordance with ASTM D1238-70.

Comparing the data of Example 9 with that of Example 10 it is seen that the flow rate of the copolyester-carbonate of the instant invention is almost five times as great as that of the conventional copolyester-carbonate. Thus, the copolyester-carbonates of the instant invention exhibit improved processability compared to the conventional copolyester-carbonate resins.

Obviously, other modifications and variations of the present invention are possible in light of the above teachings. It is, therefore, to be understood that changes may be made in the particular embodiments of the invention described which are within the full intended scope of the invention as defined by the appended claims.

What is claimed is:

1. Thermoplastic copolyester-carbonate compositions exhibiting improved processability comprised of at least one copolyester-carbonate resin consisting essentially of the reaction products of:
   (i) at least one dihydric phenol;
   (ii) at least one difunctional carboxylic acid or an ester forming reactive derivative thereof;
   (iii) a carbonyl halide carbonate precursor; and
   (iv) a processability improving amount of at least one bishaloformate selected from bishaloformates represented by the general formula

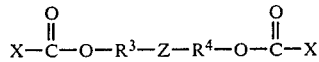

wherein:
X is independently selected from chlorine and bromine;
$R^3$ and $R^4$ are independently selected from divalent aliphatic hydrocarbon radicals; and
Z is selected from the following divalent radicals
   (a) the —O— radical,
   (b) the —S— radical,
   (c) the

radical,
   (d) the

radical,
   (e) the

radical,
   (f) the

radical,
   (g) the —O—C—O— radical,
   (h) the —$(R^6)_d$—Ar—$(R^7)_e$— radical wherein Ar represents a divalent aromatic radical, $R^6$ and $R^7$ are independently selected from alkylene radicals, and the letters d and e are independently selected from zero or one, and
   (i) a divalent organic aliphatic hetero non-cyclic radical containing at least one carbon atom and at least one hetero group or atom selected from —O—, —S—,

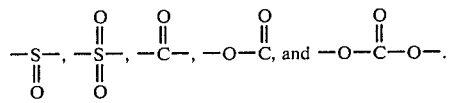

2. The compositions of claim 1 wherein R is selected from alkylene radicals and cycloalkylene radicals.

3. The compositions of claim 2 wherein said alkylene radicals contain from 1 to about 30 carbon atoms.

4. The compositions of claim 2 wherein said cycloalkylene radicals contain from 4 to about 16 ring carbon atoms.

5. The compositions of claim 1 wherein said divalent aliphatic hydrocarbon radicals represented by $R^3$ and $R^4$ are selected from alkylene radicals containing from 1 to about 30 carbon atoms and cycloalkylene radicals containing from 4 to about 16 ring carbon atoms.

6. The composition of claim 1 wherein the amount of bishaloformate present is an amount effective to improve the processability of said compositions but insufficient to significantly deleteriously affect the advantageous physical properties thereof.

7. The compositions of claim 6 wherein said amount is in the range of from about 0.5 to about 15 mole %, based on the amount of dihydric phenol present.

8. The compositions of claim 7 wherein said dihydric phenol is bisphenol-A.

9. The compositions of claim 8 wherein said carbonyl halide carbonate precursor is phosgene.

10. The compositions of claim 9 wherein a reactive derivative of a difunctional carboxylic acid is employed.

11. The compositions of claim 10 wherein said reactive derivative is selected from isophthaloyl dichloride, terephthaloyl dichloride, and mixtures thereof.

12. The compositions of claim 5 wherein said divalent aliphatic hydrocarbon radicals represented by $R^3$ and $R^4$ are selected from alkylene radicals.

13. The compositions of claim 12 wherein Z is selected from polyether radicals represented by the general formula $(-R^8-O-)_y$ wherein $R^8$ is an alkylene radical and y is a number having a value of from 2 to about 350.

14. The compositions of claim 13 wherein the amount of said bishaloformate employed is an amount effective to improve the processability of said compositions but insufficient to significantly deleteriously affect the advantageous properties of said compositions.

15. The compositions of claim 14 wherein said amount is in the range of from about 0.5 to about 15 mole percent, based on the amount of dihydric phenol employed.

16. The compositions of claim 15 wherein said dihydric phenol is bisphenol-A.

17. The compositions of claim 16 wherein said carbonyl halide carbonate precursor is phosgene.

18. The compositions of claim 17 wherein said difunctional carboxylic acid or a reactive derivative thereof is selected from isophthaloyl dichloride, terephthaloyl dichloride, and mixtures thereof.

19. The compositions of claim 13 which further contain a flame retardant amount of at least one flame retardant compound.

20. The compositions of claim 19 wherein said flame retardant compound is selected from alkali and alkaline earth metal salts of sulfonic acid.

21. The compositions of claim 13 which further contain an impact improving amount of at least one impact modifier.

* * * * *